United States Patent [19]

Faupel

[11] Patent Number: 4,633,836
[45] Date of Patent: Jan. 6, 1987

[54] METHOD AND APPARATUS FOR INJECTING FUEL TO ATTAIN A SMOOTH COMBUSTION IN A COMBUSTION ENGINE

[75] Inventor: Werner Faupel, Gerlingen, Fed. Rep. of Germany

[73] Assignee: Robert Bosch GmbH, Stuttgart, Fed. Rep. of Germany

[21] Appl. No.: 548,043

[22] Filed: Nov. 2, 1983

[30] Foreign Application Priority Data

Dec. 7, 1982 [DE] Fed. Rep. of Germany ....... 3245142

[51] Int. Cl.⁴ .............................................. F02M 39/00
[52] U.S. Cl. ..................................... 123/467; 123/447; 123/506
[58] Field of Search ............... 123/467, 447, 459, 506, 123/446, 460; 239/88–96, 126, 127, 533.3–533.12; 417/499, 569, 307, 299

[56] References Cited

U.S. PATENT DOCUMENTS

| | | | |
|---|---|---|---|
| 2,947,258 | 8/1960 | Bessiere | 123/506 |
| 3,522,999 | 8/1970 | Liles | 417/299 |
| 3,723,025 | 3/1973 | Coakley | 417/299 |
| 3,742,926 | 7/1973 | Kemp | 123/467 |
| 3,965,876 | 6/1976 | Tissot | 123/467 |
| 4,074,668 | 2/1978 | Indra | 123/467 |
| 4,077,376 | 3/1978 | Thoma | 239/126 |
| 4,099,894 | 7/1978 | Indra | 417/499 |
| 4,222,358 | 9/1980 | Hofbauer | 123/495 |
| 4,244,342 | 1/1981 | Fenne | 123/446 |
| 4,246,876 | 11/1981 | Bouwkamp | 123/467 |
| 4,408,586 | 10/1983 | Van Rinsum | 123/446 |
| 4,437,443 | 3/1984 | Hofbauer | 123/447 |

Primary Examiner—Carl Stuart Miller
Attorney, Agent, or Firm—Edwin E. Greigg

[57] ABSTRACT

A method and apparatus for injecting fuel directly into the combustion chambers of an internal combustion engine in which a hydraulic threshold switch is provided which detects the pressure reversal of the pressure course at the end of fuel pumping by a fuel injection pump to a fuel injection valve; upon the attainment of a threshold value of the decreasing pressure, fuel is diverted into a relief chamber to effect a rapid decrease of pressure.

12 Claims, 3 Drawing Figures

METHOD AND APPARATUS FOR INJECTING FUEL TO ATTAIN A SMOOTH COMBUSTION IN A COMBUSTION ENGINE

BACKGROUND OF THE INVENTION

The invention is based on a method for injecting fuel. A method of this kind can be performed using an apparatus known from German Auslegeschrift No. 1 260 865. In this apapratus, a piston is fitted into the fuel line leading to the fuel injection nozzle; the piston has a longitudinal bore provided with a throttle, and the line segments upstream and downstream of the piston are connected by means of this bore. The piston has control edges by means of which a relief line can be made to communicate with the fuel injection line downstream of the piston. Upon a pressure increase in the injection line, the piston is first displaced far enough, because of the throttling effect of the throttle, that the control edge on the piston opens the relief line. Within this period, a pre-injection takes place, which is terminated by the opening up of the relief line. Upon a further supply of fuel into the fuel injection line, the piston is displaced further and the relief line thereby closed again. At the same time, an additional connecting cross section is established between the portion of the fuel injection line upstream of the piston and the portion of the fuel injection line downstream of the piston, so that the primary injection can now take place, with a higher injection rate. This apparatus serves especially to attain smooth combustion by means of controlled, variable injection rates.

By contrast, in internal combustion engines in which the fuel is injected directly into the main combustion chamber and which are designed for a high maximum full-load engine speed, to attain sufficient combustion, it is necessary that high injection pressures be used at low engine speeds. This dictates that the nozzle cross sections be relatively small. Such a realization causes problems at the maximum full-load speed, because at that time short injection times are required as well. Rapid needle closure is also necessary.

OBJECT AND SUMMARY OF THE INVENTION

The method according to the invention has the advantage that with it, upon attaining the maximum injection pressure or shortly after exceeding the maximum injection pressure, the pressure exerted upon the valve closing member is reduced very rapidly, causing rapid closure of the injection valve and shortening the injection time.

By means of the fuel injection devices disclosed herein, advantageous embodiments for performing the method described above are made available.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
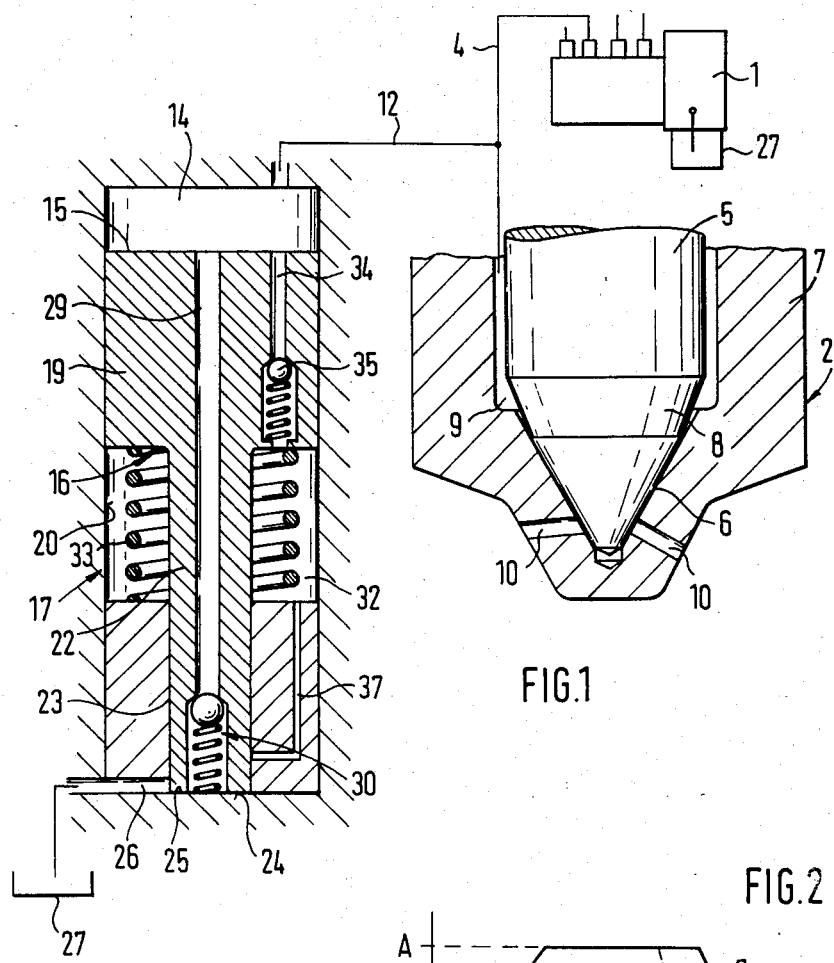
FIG. 1 is a simplified representation of one form of embodiment of the invention.

FIG. 1, in schematically simplified form, shows a fuel injection pump 1 which serves to supply fuel to an internal combustion engine, not otherwise shown. The cylinders of the engine are supplied with fuel via injection valves, of which one injection valve 2 is shown in partially cutaway form. This valve 2 is periodically supplied with metered fuel injection quantities by the fuel injection pump 1 via a fuel injection line 4. The injection valve 2 has a valve needle 5 as its valve closing member in a known manner; the valve needle 5 tapers in conical fashion to a point and cooperates with a valve seat 6 in the injection valve body 7. One part 8 of the conically shaped end of the valve needle 5 is embodied as a pressure shoulder and protrudes into a fuel pressure chamber 9, so that when the fuel pressure chamber is subjected to fuel pressure the valve needle is raised, counter to the force of a spring, not shown, and after the valve seat 6 is opened a connection is established between the fuel pressure chamber 9 and injection ports 10, so that fuel is capable of being injected into the combustion chamber. Thus far the injection valve 2 functions in a manner known per se. A connecting line 12 furthermore branches off from the fuel injection line 4 and discharges into a pressure chamber 14 of a pressure cylinder 17. The pressure chamber 14 is enclosed within a stepped cylinder 17 by means of a first end face 15 of a first stepped piston part 19 of a stepped piston 16. This stepped cylinder 17 may be formed, as shown, by an annular cylindrical part including a bore 20 of large diameter and a part 23 having an inner bore of lesser diameter which receives the stepped piston 16. The first end face 15 of the stepped piston 16 is the outer end face of a first stepped piston part 19 of larger diameter, which is tightly displaceable within the first cylinder part 20 of the stepped cylinder 17 having the correspondingly larger diameter. On the side opposite the first end face 15, the first stepped piston part 19 makes a transition to a coaxially extending second stepped piston part 22, which dips into the second partial cylinder 23 of the stepped cylinder 17. The second cylinder 23 is also closed on its end by the wall of the cylinder and there, in the area of overlap with the second stepped piston part 22 forms a valve seat 24, which forms a valve with the outer end face 25 of the second stepped piston part 22, which simultaneously acts as the valve closing member. A relief bore 26 branches off from the cylinder wall of the second cylinder 23 at the outermost end adjacent the valve seat 24 of the second cylinder, leading to a fuel supply container 27. This container may be the same supply container from which the fuel injection pump 1 is supplied with fuel.

The stepped piston 16 has an axially aligned longitudinal bore 29, through which the pressure chamber 14 can be made to communicate with the second cylinder 23 via the valve seat 24. A check valve 30 which opens in the direction toward the valve seat 24 is disposed in the longitudinal bore 29. The check valve 30 is located as closely as possible to the valve seat of the second stepped piston part 22. The valve seat also functions as a stop for the stepped piston 16.

An annular chamber 32 is formed between the first stepped piston part 19 and the part 23 of the stepped cylinder 17 and a restoring spring 33 supported on the first stepped piston part 19 is fastened in this annular chamber 32 coaxially with the stepped piston 16. The annular chamber 32 also communicates with the pressure chamber 14 via a connecting bore 34, in which a cheeck valve 35 opening toward the annular chamber 32 is disposed. The annular chamber 32 can also be made to communicate via a bore 37 with the end toward the valve seat 24.

Figure 2:
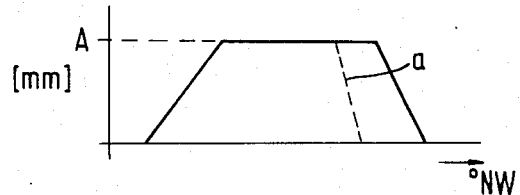
FIG. 2 is a diagram in which the stroke of the injection valve needle is plotted over the angle of rotation.
Figure 3:
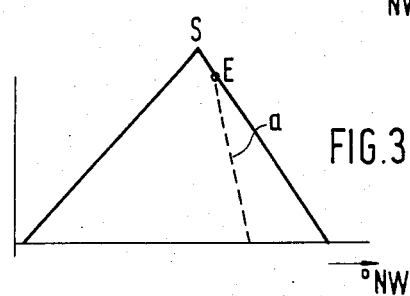
FIG. 3 is a diagram showing the course of the injection pressure over the angle of rotation.

The apparatus described functions as follows: As soon as fuel for the injection is pumped by the injection pump 1 into the fuel injection line 4, the pressure in the fuel pressure chamber 9 and chamber 14 increases, as is shown in FIG. 3. Beyond a predetermined pressure, the valve needle 5 is raised, in fact to such an extent that it is made to assume a maximum opening position A. This association can be learned from FIG. 2. Prior to the beginning of the pressure increase, the stepped piston 19 is in its uppermost position, at which the restoring spring 33 is maximally stressed. The second stepped piston part 22 has also, with its outer end face 25, opened the bore 37, so that the annular chamber 32 is relieved of pressure. The check valve 35 prevents the further outflow of fuel out of the pressure chamber 14. On this point, it should be noted that the connecting line 12 should be kept as short as possible.

With the beginning of the pressure increase in pressure chamber 9 and chamber 14, the stepped piston 16 is displaced until it strikes the valve seat 24, pump pressure builds up in chamber 14 which overcomes the spring force of the valve 35 whereupon the same pressure is established in the annular chamber 32 as also prevails in the pressure chamber 14 or in the fuel pressure chamber 9. In this position, the stepped piston 16 is pressed against the valve seat 24 with a force which is the product of the area of the pressure face of the second stepped piston part 22 minus the restoring force of the spring 33, preventing communication of the bore 37 with the relief bore 26.

If, after exceeding the peak injection pressure S (see FIG. 3), the injection pressure now drops again toward the end of the injection period due to fuel injection through ports 10, then the forces acting in the opening direction of the valve 24/25—that is, the pressure on the annular face of the first stepped piston part 19 in the annular chamber 32 and the restoring forces of the restoring spring 33 at point E (see FIG. 3)—attain a value which is greater than the previously existing closing force. At this instant, the stepped piston 16 is raised from the valve seat 24, and communication is established between the longitudinal bore 29 and the relief bore 26. As a result of this relief, the check valve 30 opens because the valve spring seats on face 24 and does not rise with the piston 16, so that the pressure chamber 14 is consequently connected with the relief bore 26, and the pressure at the valve needle 5 is capable of decreasing very rapidly by means of additional outflowing fuel. The result is that the valve needle is capable of performing its closure process very quickly at the end of the injection, as is indicated in FIGS. 2 and 3 by the dashed line a.

The overall result is quicker closing of the valve needle 9, so that the average pressure level during the injection process is increased as compared with conventional realizations. This has the effect of improved combustion in direct-injection engines. The duration of injection is shortened, because injection is now effected only during the pumping phase of the injection pump. The end of pumping by the injection pump is detected by detecting the reversal in the pressure. The apparatus functions in this sense as a hydraulic threshold switch, by means of which not only is the attainment of a predetermined decreasing pressure level detected, but also an abrupt bringing to bear of means which accelerate the further pressure decrease is attained. In this specialized exemplary embodiment, these means are the opening of the relief bore 26 effected at the switchover point, thereby relieving the pressure chamber 14 or the fuel pressure chamber 9.

The apparatus described can also be realized without a spring 33 in the annular chamber 32; in that case, the time behavior is somewhat modified. In this case, upon a pressure increase in the pressure chamber 14, the stepped piston very quickly comes to rest on the valve seat 24. If the pressure in the pressure chamber 14 drops and the force resulting from the pressure relief of the stepped piston by reducing the pressure enclosed in the annular chamber 32 then predominates, then the valve 24/25 is opened, and further relief of pressure is accelerated in the manner of a threshold switch.

It is furthermore possible, in order to stabilize the stepped piston in its terminal position resting on the valve seat 24, for a weak adjusting spring acting in that direction to engage the stepped piston; after the reversal of pressure in the compression chamber 14, the pressure stored in the annular chamber 32 and exerted against this spring then opens the valve 24/25.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A fuel injection apparatus for internal combustion engines comprising a fuel injection pump which supplies a fuel for injection and a fuel injection valve, said injection valve including a valve closing member which opens counter to a restoring force under pressure of the fuel supplied for injection by the fuel injection pump, a cylinder including a piston influencing the course of injection, one end face of the piston enclosing in said cylinder a pressure chamber, which exposes said piston to the pressure of the fuel pumped by the fuel injection pump, said piston is displaceable as far as a stop which forms a valve seat, said piston including an end face which seats on said valve seat to form a valve, by means of which a relief bore leading away from said valve seat is controllable, and said relief bore communicates upon the raising of the piston from the end face, with said pressure chamber via a longitudinal bore in the piston.

2. A fuel injection apparatus as defined by claim 1, in which a check valve opening in the direction of the relief bore is disposed in the longitudinal bore in said piston.

3. A fuel injection pump as defined by claim 1, wherein said piston is embodied as a stepped piston, having a first stepped piston part of larger diameter and a second stepped piston part of smaller diameter, said stepped piston is displaceably disposed in a stepped cylinder having a first cylinder of larger diameter and a second cylinder of smaller diameter, wherein the first stepped piston part includes an end face which encloses the pressure chamber in the first cylinder and the end face of the second stepped piston part forms a valve with the end face of the second cylinder.

4. A fuel injection pump as defined by claim 2, wherein said piston is embodied as a stepped piston, having a first stepped piston part of larger diameter and a second stepped piston part of smaller diameter, said stepped piston is displaceably disposed in a stepped cylinder having a first cylinder of larger diameter and a second cylinder of smaller diameter, wherein the first stepped piston part includes an end face which encloses the pressure chamber in the first cylinder and the end face of the second stepped piston part forms a valve with the end face of the second cylinder.

5. A fuel injection apparatus as defined by claim 3, which includes an annular chamber enclosed in the first cylinder by the first stepped piston part and a portion of the second stepped piston part communicates with the pressure chamber via a connecting bore containing a check valve opening in the direction of the annular chamber.

6. A fuel injection apparatus as defined by claim 4, which includes an annular chamber enclosed in the first cylinder by the first stepped piston part and a portion of the second stepped piston part communicates with the pressure chamber via a connecting bore containing a check valve opening in the direction of the annular chamber.

7. A fuel injection apparatus as defined by claim 5, in which an adjusting spring is disposed in the annular chamber and acts upon said stepped piston.

8. A fuel injection apparatus as defined by claim 6, in which an adjusting spring is disposed in the annular chamber and acts upon said stepped piston.

9. A fuel injection apparatus as defined by claim 5, in which said annular chamber communicates via a connecting bore with a portion of the second cylinder adjacent to the cylinder end face, and the discharge of the connecting bore is controllable by means of the second stepped piston part.

10. A fuel injection apparatus as defined by claim 6, in which said annular chamber communicates via a connecting bore with a portion of the second cylinder adjacent to the cylinder end face, and the discharge of the connecting bore is controllable by means of the second stepped piston part.

11. A fuel injection pump as defined by claim 5, in which a compression spring is disposed in the pressure chamber and acts upon said stepped piston.

12. A method for injecting fuel into a combustion chamber of an engine to attain a smooth combustion which comprises:

pumping fuel under pressure to a fuel injection valve having a closing member which is opened by pressurized pumped fuel against a restoring force, wherein a closure of injection of pressurized fuel during an injection process is influenced by a withdrawal of fuel, directing the pumped and pressurized fuel simultaneously to said fuel injection valve and to a hydraulic threshold switch which detects a pressure reversal of the pumped fuel pressure at the fuel injection valve at an end of a fuel pumping period by a fuel injection pump, and directing a portion of said pressurized fuel contained within the fuel system between the valve closing member and the fuel injection pump at an end of injection by the fuel injection valve through the hydraulic threshold switch into a relief chamber to effect a rapid decrease of pressure in said fuel system.

* * * * *